United States Patent [19]

Shaw

[11] 3,755,717

[45] Aug. 28, 1973

[54] WIRING ARRANGEMENT

[75] Inventor: Jeffery Isaac Shaw, Cook Hill, near Alcester, England

[73] Assignee: Joseph Lucas (Industries) Limited, Birmingham, England

[22] Filed: May 12, 1972

[21] Appl. No.: 252,742

[30] Foreign Application Priority Data

May 14, 1971 Great Britain .................. 15,032/71

[52] U.S. Cl. ...... 317/101 F, 174/68.5, 317/101 DH

[51] Int. Cl. ............................................ H05k 1/04

[58] Field of Search .................. 317/101 F, 101 DH, 317/101 CW; 174/68.5

[56] References Cited

UNITED STATES PATENTS 3,505,520 4/1970 Sprude et al. ............... 317/101 CW

*Primary Examiner*—David Smith, Jr.
*Attorney*—John C. Holman et al.

[57] ABSTRACT

A flexible electric wiring arrangement has an insulating sheet carrying a conductor pattern. The sheet is slotted and folded so as to be cruciform in plan and so that one side of the sheet defines eight outwardly directed surfaces to which components can be attached.

12 Claims, 6 Drawing Figures

WIRING ARRANGEMENT

This invention relates to arrangements of flexible electric wiring, and has an object to provide such an arrangement in a convenient form.

A wiring arrangement according to the invention comprises a flexible sheet of insulating material having a conductor pattern thereon, the said sheet having a first fold, of 180°, which is convex with respect to one side of the sheet, second and third folds, of 90° each, substantially parallel to the first fold and substantially equispaced therefrom, said second and third folds being concave with respect to said one side, a slot extending through said sheet between said second and third folds and substantially perpendicular thereto and a fourth fold, of 180°, along the line of the slot and convex with respect to said one face, the arrangement being such that said folded sheet has a configuration which is generally cruciform in plan and said one side defines eight surfaces which are directed outwardly of the folded sheet, and means for making electrical connections to the sheet.

The invention also resides in a circuit assembly comprising a wiring arrangement as above defined, a plurality of components mounted on said one side of the sheet and electrically connected to said conductor pattern and a support engaged by the other side of the sheet to maintain the latter in its folded configuration.

The invention further resides in a wiring arrangement as above defined, including means for mounting components on said one side of the sheet said mounting means comprising a rigid plate secured to an outwardly directed surface of the sheet, a layer of rigid insulating material upon which said components are mounted, a resiliently deformable adhesive layer securing said insulating layer to said plate and electrical connectors between said components and said conductor pattern on the sheet.

An example of the invention will now be described with reference to the accompanying drawings, in which.

Figures 1, 2:
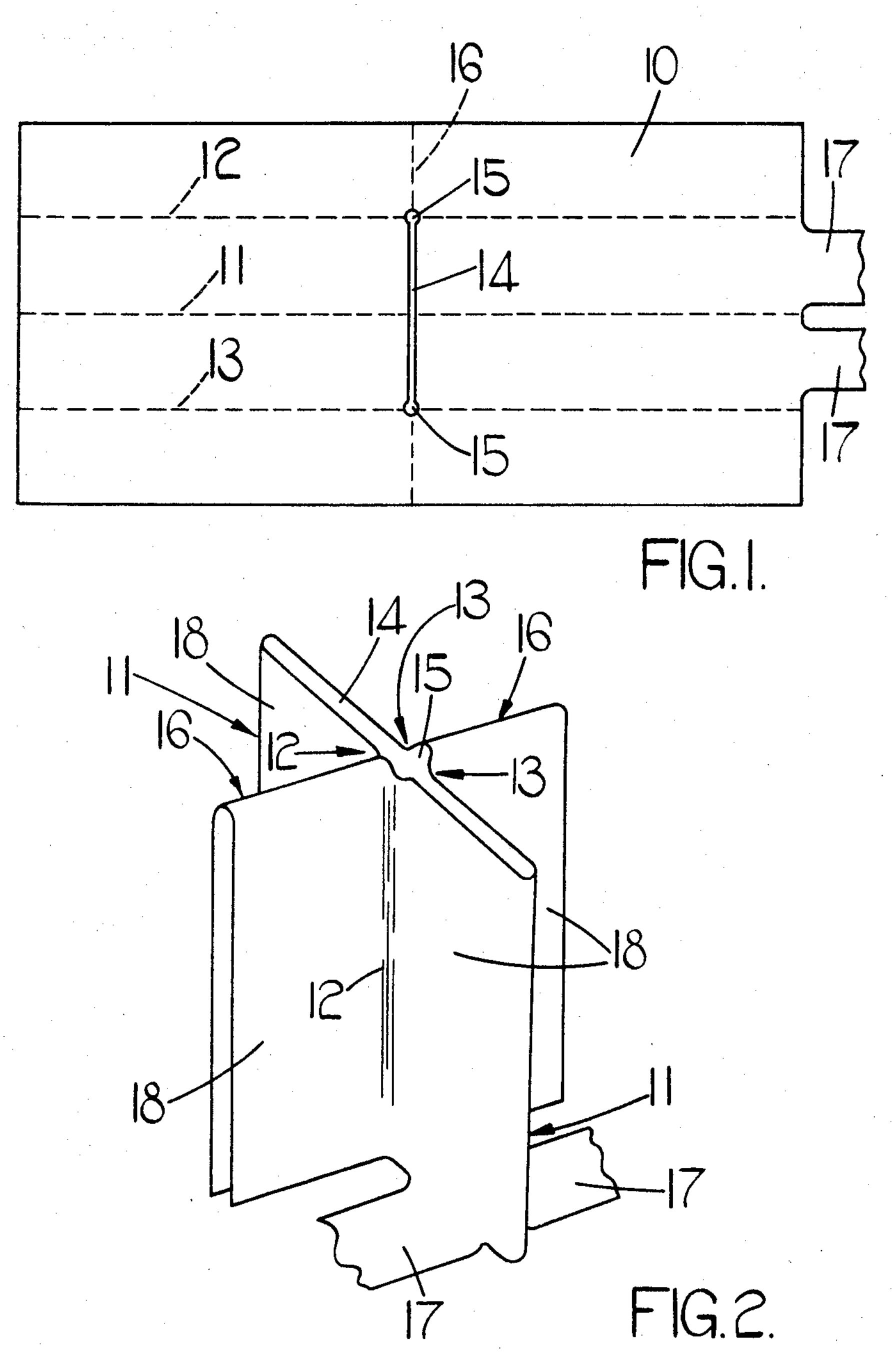
FIG. 1 shows a plan outline of a flexible sheet of printed wiring.
FIG. 2 is a perspective view of the sheet of FIG. 1 when folded.
Figure 3:
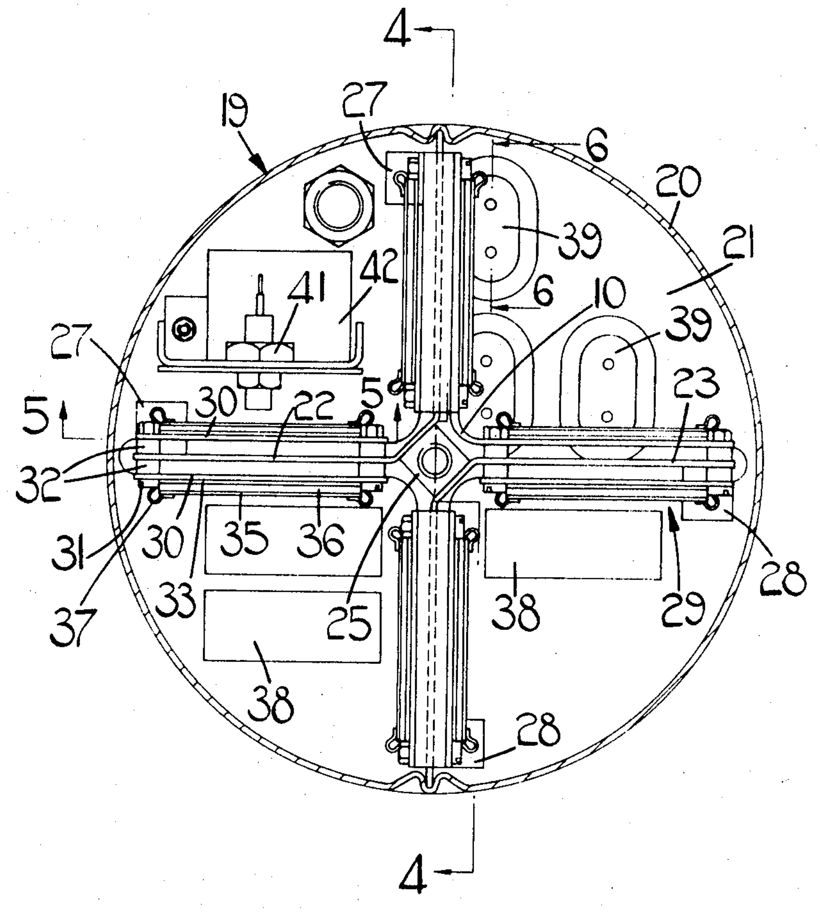
Figure 4:
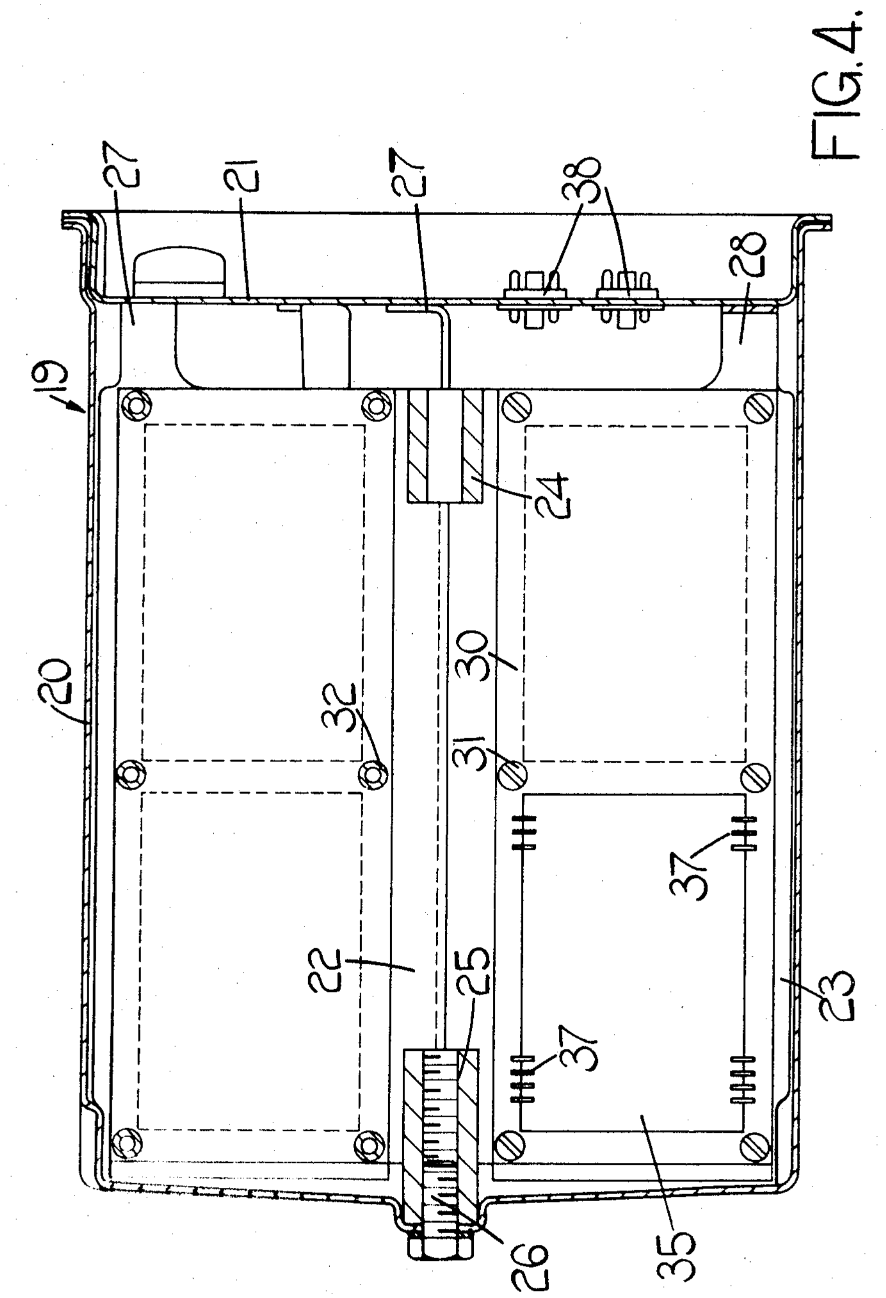
Figure 5:
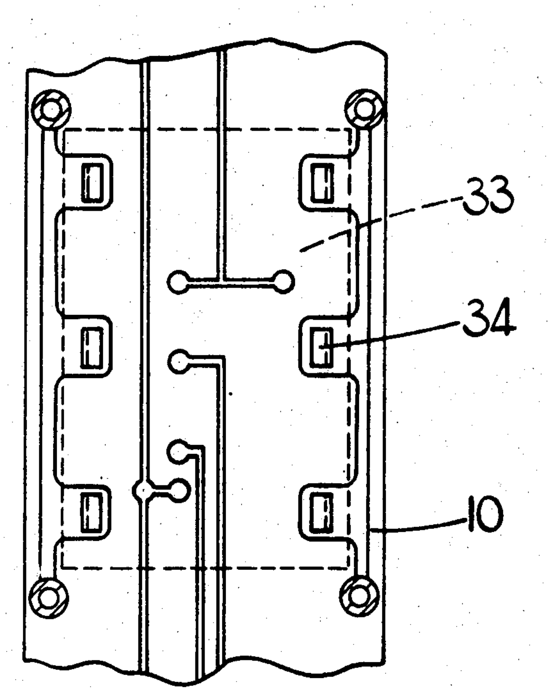
Figure 6:
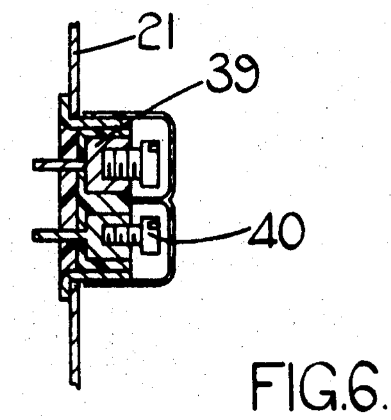

FIG. 3 shows a section through an assembly incorporating the sheet shown in FIG. 2, FIG. 4 is a section on line 4—4 in FIG. 3, FIG. 5 is a scrap view on line 5—5 in FIG. 3, and FIG. 6 is a scrap section on line 6—6 in FIG. 3.

The sheet 10 shown in FIG. 1 is of generally rectangular shape and comprises a flexible plastics membrane having on one side a so-called printed wiring arrangement. The wiring arrangement is presumed to be on the side of the sheet 10 remote from that shown in FIG. 1. Sheet 10 is formed with a fold 11 in equi-spaced parallel relationship with one of the pairs of sides of the sheet. Fold 11 is convex with respect to the side of the sheet visible in FIG. 1. A pair of folds 12, 13 extend across sheet 10 parallel to fold 11 and respectively equally spaced between fold 11 and one of the afore mentioned pair of edges. Folds 12, 13 are concave with respect to the visible side of sheet 10. A slot 14 through the sheet 10 extends perpendicular to folds 11, 12, 13 and between folds 12, 13. Slot 14 has cutaway relief portions 15 at its ends.

Sheet 10 is further formed with a fold 16 which extends across the sheet in alignment with slot 14. Integral strips 17 extend from one edge of sheet 10 to provide connections to the wiring arrangement.

Sheet 10 when cut and folded as described adopts the configuration shown in FIG. 2. This configuration is cruciform in plan, and the side of sheet 10 shown in FIG. 1 defines eight surfaces 18 of equal area which face externally of the folded sheet.

The assembly shown in FIGS. 3 and 4 includes a container 19 having a substantially cylindrical casing 20 sealingly secured to a base 21 in a manner later to be described. Welded to the base 21 is a bracket arrangement comprising a pair of mild steel plates 22, 23 each of which is welded to a pair of rectangular blocks 24, 25. Plates 22, 23 are each formed with a pair of 135° internal bends away from the blocks 24, 25 the wings of plates 22, 23 providing a cruciform configuration as shown in FIG. 3. Block 25 has an axial threaded bore engageable by a bolt 26 to secure portion 20 to base 21. The bracket arrangement is welded to base 21 by means of legs 27, 28 which extend from the plates 22, 23 respectively.

Each of the surfaces 18 of the folded sheet 10 supports an assembly 29 by means of which electrical components are mounted on sheet 10 and connected to the associated wiring arrangement. Each assembly 29 includes a glass/epoxy resin sheet 30 which is secured to one of the adjacent plates 22, 23 by screws 31 which pass through the sheet 10. Spacers 32 maintain the sheet 10 a required distance from the plates 22, 23. Sheets 30 act as a support for the remainder of the assemblies 29. Each assembly 29 includes a pair of mild steel plates 33 which have bent down lugs 34 (FIG. 5). Lugs 34 extend through aligned slots in sheet 30 and sheet 10, lugs 34 being bent over and soldered to appropriate parts of the wiring arrangements on sheet 10. Mild steel plates 33 provide bases to which ceramic blocks 35 are secured by a layer 36 of resiliently deformable insulating adhesive material, as for example that commercially available from the Midland Silicones Division of Dow Corning under the name of SILASTOSEAL D. Blocks 35 carry electrical components (not shown) and provide multi-layer interconnections between the components.

Wire connections 37 from the blocks 35 pass through the glass epoxy sheet 30 and the sheet 10 and are soldered to appropriate parts of the wiring arrangement on sheet 10. Base 21 of container 19 supports a number of multi-way electrical connectors 38 whose pins sealingly extend through base 21. Electrical connections are made between connectors 38 and the wiring on strips 17 of sheet 10. Additional electrical connectors 39, shown in detail in FIG. 6, are sealingly mounted on base 21. Connectors 39 are provided externally of the container 19 with screws 40 which can engage terminal leads on external apparatus.

Additional equipment may be mounted on/or within container 19, as for example a power diode 41 on a bracket 42, bracket 42 making good thermal contact both with diode 41 and base 21. In an alternative form of the assemblies 29 the resin sheet 30 is dispensed with and support for the remaining parts of the assemblies 29 is provided by local thickening of the sheet 10 which extends over the areas of surfaces 18.

I claim

1. A wiring arrangement comprising a flexible sheet of insulating material having a conductor pattern thereon, the said sheet having a first fold, of 180°, which is convex with respect to one side of the sheet, second and third folds, of 90° each, substantially parallel to the first fold and substantially equispaced therefrom, said second and third folds being concave with respect to said one side, a slot extending through said sheet between said second and third folds and substantially perpendicular thereto and a fourth fold, of 180°, along the line of the slot and convex with respect to said one face, the arrangements being such that said folded sheet has a configuration which is generally cruciform in plan and said one side defines eight surfaces which are directed outwardly of the folded sheet, and means for making electrical connections to the sheet.

2. A wiring arrangement as claimed in claim 1 in which the means for making electrical connections to the sheet includes a strip integral with the sheet and extending from an edge thereof.

3. An arrangement as claimed in claim 1 which includes means for mounting components on said one side of the sheet, said mounting means comprising a rigid plate secured to an outwardly directed surface of the sheet, a layer of rigid insulating material upon which said components are mounted, a resiliently deformable adhesive layer securing said insulating layer to said plate and electrical connectors between said components and said conductor pattern on the sheet.

4. A circuit assembly comprising a wiring arrangement as claimed in claim 1 a plurality of components mounted on said one side of the sheet and electrically connected to said conductor pattern and a support engaged by the other side of the sheet to maintain the latter in its folded configuration.

5. An assembly as claimed in claim 4 in which said support comprises a base and a bracket secured to said base, said bracket being generally cruciform in plan.

6. An assembly as claimed in claim 5 in which said support includes spacers which engage said other side of the sheet to maintain the latter in spaced relationship with the remainder of said support.

7. An assembly as claimed in claim 5 which includes a casing sealingly engaging said base to define a container for said wiring arrangement.

8. An assembly as claimed in claim 7 which includes means engageable with said bracket and said casing to urge the latter into sealing engagement with said base.

9. An assembly as claimed in claim 7 which includes means for sealingly providing an electrical connection between said wiring arrangement and the outside of said container.

10. An assembly as claimed in any claim 5 which includes an insulating board secured to said support so as to lie closely adjacent one of said eight surfaces on said flexible sheet, a metal plate secured to said flexible sheet through said insulating board so as to lie against the latter, a ceramic element adhesively and resiliently secured to said metal plate, said ceramic element supporting electrical components and electrical conductors, and electrical connections between the conductors on said ceramic element and the conductor pattern on said sheet.

11. An assembly as claimed in claim 10 in which there are a plurality of metal plates secured against said insulating board, each said metal plate having an associated ceramic element secured thereto.

12. An assembly as claimed in claim 10 or in which there are a plurality of said insulating boards secured to said support so as to lie adjacent respective ones of said sheet surfaces, each said insulating board having an associated metal plate and ceramic element.

* * * * *